United States Patent
Kuno et al.

(10) Patent No.: US 6,244,674 B1
(45) Date of Patent: Jun. 12, 2001

(54) BRAKE CONTROL SYSTEM FOR AN ELECTRICALLY OPERATED VEHICLE

(75) Inventors: Tetsuya Kuno; Tadashi Terazawa, both of Toyota; Yoshinori Suzuki, Chita gun; Harumi Ohori; Shingo Urababa, both of Toyota, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/153,849

(22) Filed: Sep. 16, 1998

(30) Foreign Application Priority Data

Sep. 17, 1997 (JP) .................................................. 9-270412

(51) Int. Cl.⁷ ...................................................... B60L 7/10
(52) U.S. Cl. .............................. 303/152; 180/165; 303/3
(58) Field of Search ...................... 303/3, 15, 20, 303/152; 180/165, 65.1–65.4

(56) References Cited

U.S. PATENT DOCUMENTS

| | | | |
|---|---|---|---|
| 5,326,158 | * 7/1994 | Ohori et al. | 303/3 |
| 5,450,324 | * 9/1995 | Cikanek | 303/3 |
| 5,492,192 | * 2/1996 | Brooks et al. | 303/152 |
| 5,511,859 | * 4/1996 | Kade et al. | 303/3 |
| 5,707,115 | * 1/1998 | Bodie et al. | 303/3 |
| 5,895,100 | * 4/1999 | Ito et al. | 303/152 |

FOREIGN PATENT DOCUMENTS

| | | |
|---|---|---|
| 5-161210 | 6/1993 | (JP) . |
| 7-336806 | 12/1995 | (JP) . |

\* cited by examiner

Primary Examiner—Matthew C. Graham
(74) Attorney, Agent, or Firm—Burns, Doane, Swecker & Mathis, LLP

(57) ABSTRACT

The present invention is directed to a brake control system for an electrically operated vehicle, which is adapted to reduce a regenerative braking torque and add a hydraulic braking force. A motor control unit is provided for controlling an electric motor to apply a rotating force to a wheel and apply the regenerative braking torque to the wheel. A pressure control device is provided for controlling a hydraulic braking pressure generated by a pressure generator in response to operation of a manually operated braking member, and supplied to a wheel brake cylinder, which is operatively mounted on the wheel for applying a hydraulic braking force to the wheel. The regenerative braking torque is reduced in response to a braking condition monitored by a monitor. A pressure difference is detected between the hydraulic braking pressure of the brake fluid discharged from the pressure generator and the hydraulic braking pressure in the wheel brake cylinder. And, a characteristic of the regenerative braking torque to be reduced is modified in response to the pressure difference, to compensate for lack of regenerative braking torque by the hydraulic braking force, smoothly.

5 Claims, 5 Drawing Sheets

BRAKE CONTROL SYSTEM FOR AN ELECTRICALLY OPERATED VEHICLE

This application claims priority under 35 U.S.C. 119 to No. 9-270412 filed in Japan on Sep. 17, 1997, the entire content of which is herein incorporated by reference.

BACKGROUND OF THE INVENTION

1. Field of the Invention

The present invention relates to a brake control system for an electrically operated vehicle to perform a regenerative braking operation and a hydraulic braking operation, and more particularly to the brake control system which is adapted to reduce a regenerative braking torque and add a hydraulic braking force to compensate for a lack of regenerative braking torque, smoothly.

2. Description of the Related Arts

In an electrically operated vehicle provided with an electric motor as a power source, the electric motor also functions as a generator for performing the regenerative braking operation to recover energy by charging a battery and use the energy for driving the motor. Since the braking force applied to the vehicle wheels through the regenerative braking operation is limited, a lack of braking force must be compensated by the hydraulic braking operation for example. Therefore, both of the regenerative braking operation and the hydraulic braking operation are performed, as disclosed in Japanese Patent Laid-open Publication No. 5-161210. According to the prior brake control system for the electrically operated vehicle as disclosed in the Publication No. 5-161210, the regenerative braking torque is set in accordance with a predetermined torque map or hydraulic pressure coefficient, and a lack of regenerative braking torque, which is caused in a relatively low speed range for example, is compensated by the hydraulic braking operation or the like. However, since the hydraulic braking force to be compensated is varied, the amount of regenerative braking torque to be compensated may be excessive occasionally. In this case, feelings to a vehicle driver in his braking operation will be varied.

SUMMARY OF THE INVENTION

Accordingly, it is an object of the present invention to provide a brake control system for an electrically operated vehicle which provides effective countermeasures to a variation of hydraulic braking force to be compensated for a lack of regenerative braking force, thereby to ensure a proper brake feeling.

In accomplishing the above and other objects, a brake control system is provided for controlling a braking force applied to a wheel of an electrically operated vehicle. The brake control system includes an electric motor which is operatively connected to the wheel for rotating the wheel. A battery is mounted on the vehicle and electrically connected to the electric motor for driving the electric motor. A motor control unit is provided for controlling the electric motor to apply a rotating force to the wheel and apply a regenerative braking force to the wheel. A wheel brake cylinder is operatively mounted on the wheel for applying a hydraulic braking force to the wheel. A pressure generator is provided for pressurizing brake fluid to generate a hydraulic braking pressure in response to operation of a manually operated braking member. A pressure control device is provided for controlling the hydraulic braking pressure generated by the pressure generator and supplied to the wheel brake cylinder to apply the hydraulic braking force to the wheel. A monitor is provided for monitoring a braking condition of the vehicle. A braking torque reducing device is provided for reducing the regenerative braking torque in response to the braking condition monitored by the monitor. A pressure difference detector is provided for detecting a pressure difference between the hydraulic braking pressure of the brake fluid discharged from the pressure generator and the hydraulic braking pressure in the wheel brake cylinder. And, a modifying device is provided for modifying a characteristic of the regenerative braking torque reduced by the braking torque reducing device, in response to the pressure difference detected by the pressure difference detector.

In the brake control system as described above, the pressure generator may include a master cylinder for pressurizing the brake fluid stored in a reservoir in response to operation of the manually operated braking member to generate a static hydraulic braking pressure, and the pressure difference detector may be adapted to detect the pressure difference between the hydraulic braking pressure of the brake fluid discharged from the master cylinder and the hydraulic braking pressure in the wheel brake cylinder.

Preferably, the pressure control device includes a master cylinder for pressurizing the brake fluid stored in a reservoir in response to operation of the manually operated braking member to generate a static hydraulic braking pressure, and an auxiliary power source for pressurizing the brake fluid stored in the reservoir irrespective of operation of the manually operated braking member to generate a power hydraulic pressure. And, the pressure control device may be adapted to supply the power hydraulic pressure to the wheel brake cylinder to apply the hydraulic braking force to the wheel, and the pressure difference detector may be adapted to detect the pressure difference between the hydraulic braking pressure of the brake fluid discharged from the master cylinder and the hydraulic braking pressure in the wheel brake cylinder.

BRIEF DESCRIPTION OF THE DRAWINGS

The above stated object and following description will become readily apparent with reference to the accompanying drawings herein like reference numerals denote like elements, and in which.

DESCRIPTION OF THE PREFERRED EMBODIMENT

Figure 1:
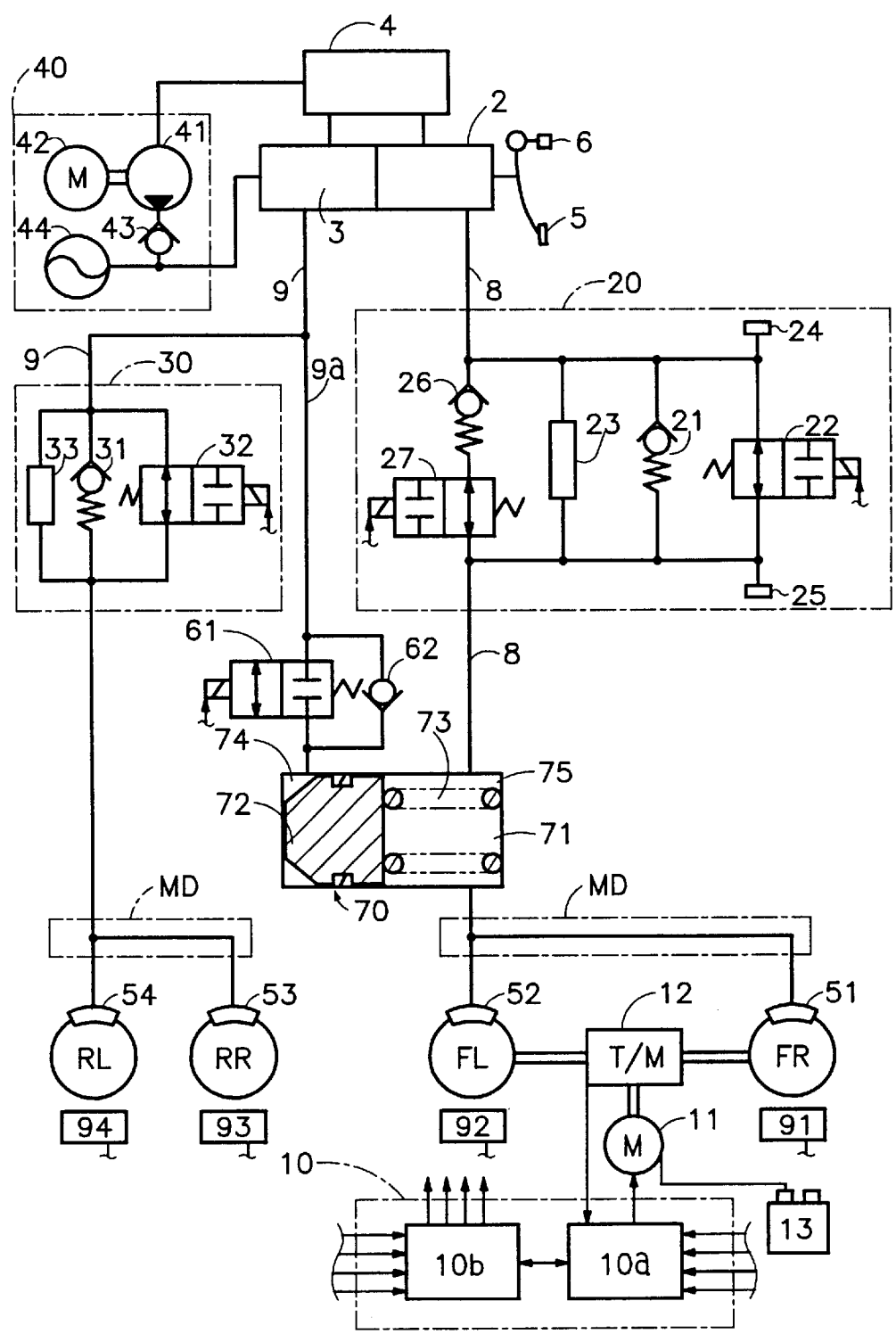
FIG. 1 is a block diagram illustrating a brake control system for an electrically operated vehicle according to an embodiment of the present invention.

Referring to FIG. 1, there is schematically illustrated a brake control system for an electrically operated vehicle according to an embodiment of the present invention, which includes an electric motor 11 for performing a regenerative braking operation and a hydraulic pressure control apparatus for performing a hydraulic braking operation. The hydraulic pressure control apparatus has a master cylinder 2 which serves as a static pressure generator, and a regulator 3 which serves as a dynamic pressure generator, both of which are operated in response to depression of a brake pedal 5. Referring to FIG. 1, wheel brake cylinders 51, 52, 53, 54 are operatively mounted on wheels (FR), (FL), (RR), (RL) to apply braking force thereto, respectively. The wheel (FR) designates a wheel at the fore right side as viewed from the position of a driver's seat, the wheel (FL) designates a wheel at the fore left side, the wheel (RR) designates a wheel at the rear right side, and the wheel (RL) designates a wheel at the rear left side. According to the present embodiment, a front and rear dual-circuit system has been employed to divide the circuit into a front pressure circuit and a rear pressure circuit.

According to the present embodiment, a front drive system has been employed, so that the front wheels (FR), (FL) are driven, and the rear wheels (RR), (RL) are not driven. The front wheels (FR), (FL) are connected to the electric motor 11 through a transmission 12. The electric motor 11 is controlled by an electronic control unit 10 which includes a microcomputer 10a for controlling the electric motor 11, which serves as a motor control unit, and a microcomputer 10b for controlling the hydraulic braking pressure, which serves as a hydraulic control unit. The basic structure of each microcomputer is similar to the one disclosed in the prior publication such as Japanese Patent Laid-open Publication No. 7-336806, so that further explanation is omitted. The electric motor 11 used in the present embodiment is an induction motor having a rotor with permanent magnets for providing magnetic poles, and a stator with three-phase wires to which A.C. power is fed to generate a magnetic field for rotating the rotor. Therefore, a drive circuit (not shown) controlled by the microcomputer is provided with a plurality of inverters (not shown). When the rotor of the electric motor 11 is rotating in accordance with the rotation of the wheels (FR), (FL), the electric motor 11 can be braked by generating a magnetic field for preventing the rotor from rotating. The electric power generated in the stator is recovered to charge a battery 13 thereby to brake the wheels, i.e., to perform the regenerative braking operation.

Referring to FIG. 1, the master cylinder 2 has a chamber which is connected to a low-pressure reservoir 4 for storing brake fluid therein. In a main passage 8 which communicates the pressure chamber of the master cylinder 2 with the front wheel brake cylinders 51, 52, a pressure limit changeover device 20 is disposed to add the hydraulic braking operation to the regenerative braking operation, and change the former for the latter. In a main passage 9 which communicates the regulator 3 with the rear wheel brake cylinders 53, 54, is disposed a pressure limit changeover device 30 which is slightly different from the pressure limit changeover device 20, as described later. The regulator 3 is connected to an auxiliary power source 40, and both of them are connected to the low-pressure reservoir 4 to which the master cylinder 2 is connected. The auxiliary power source 40 includes a hydraulic pump 41 and an accumulator 44. The hydraulic pump 41 is driven by an electric motor 42 to pressurize the brake fluid in the reservoir 4 and discharge it into the accumulator 44 through a check valve 43. The electric motor 42 is activated when the pressure in the accumulator 44 is lower than a predetermined lower limit, and stopped when the pressure in the accumulator 44 exceeds a predetermined upper limit. Accordingly, the power pressure is supplied from the accumulator 44 into the regulator 3, which regulates the power pressure in response to a pilot pressure of the master cylinder pressure output from the master cylinder 2 to generate a regulated pressure in proportion to the master cylinder pressure, so as to be substantially the same pressure as the master cylinder pressure, like a known regulator. A part of the regulated pressure is provided for assisting or boosting the operation of the master cylinder 2.

In the pressure limit changeover device 20, a first relief valve 21, a solenoid valve 22, a proportioning valve 23 and a second relief valve 26 are arranged in parallel with each other. Furthermore, a solenoid valve 27 is disposed in series with the second relief valve 26. The first relief valve 21 is adapted to operate in such a manner that it is held to close the main passage 8 until the hydraulic pressure generated by the master cylinder 2, i.e., master cylinder pressure, reaches a predetermined pressure (Pc), and actuated to open the main passage 8 when the master cylinder pressure exceeds the predetermined pressure (Pc). The second relief valve 26 is adapted to operate in such a manner that it is held to close the main passage 8 until the master cylinder pressure reaches a predetermined pressure (Pb) which is lower than the predetermined pressure (Pc), and actuated to open the main passage 8 when the master cylinder pressure exceeds the predetermined pressure (Pb).

The solenoid valve 22 is controlled by the electronic control unit 10 to be opened or closed in response to a maximum regenerative braking force. Also, the solenoid valve 27 is controlled by the electronic control unit 10 to be opened or closed in response to the maximum regenerative braking force, more particularly in response to a maximum vehicle speed or a maximum regenerative braking torque. The proportioning valve 23 has such a characteristic that the master cylinder pressure is increased in response to depression of the brake pedal 5 to supply it to the wheel brake cylinders 51, 52. The proportioning valve 23 has substantially the same structure as that of a conventional proportioning valve for use in a front-rear braking force distribution control, but has a break point in its input-output characteristic to be set at a lower pressure than the conventional proportioning valve, which will be described later in detail. A pair of pressure sensors 24, 25 are connected to the upstream and downstream of the first relief valve 21 and the solenoid valve 22, respectively.

The pressure limit changeover device 30 provided for the rear pressure circuit includes a relief valve 31, a solenoid valve 32 and a proportioning valve 33 which are disposed in parallel with one another. It does not include those corresponding to the second relief valve 26 and the solenoid valve 27, but may include them. The relief valve 31 operates in such a manner that it is held to close the main passage 9 until the master cylinder pressure reaches a predetermined pressure (Pc), and actuated to open the main passage 9 when the master cylinder pressure exceeds the predetermined pressure (Pc). The solenoid valve 32 is controlled to be opened or closed in response to the regenerative braking torque in substantially the same manner as the solenoid valve 22, and the proportioning valve 33 functions in substantially the same manner as the proportioning valve 23.

Figure 6:
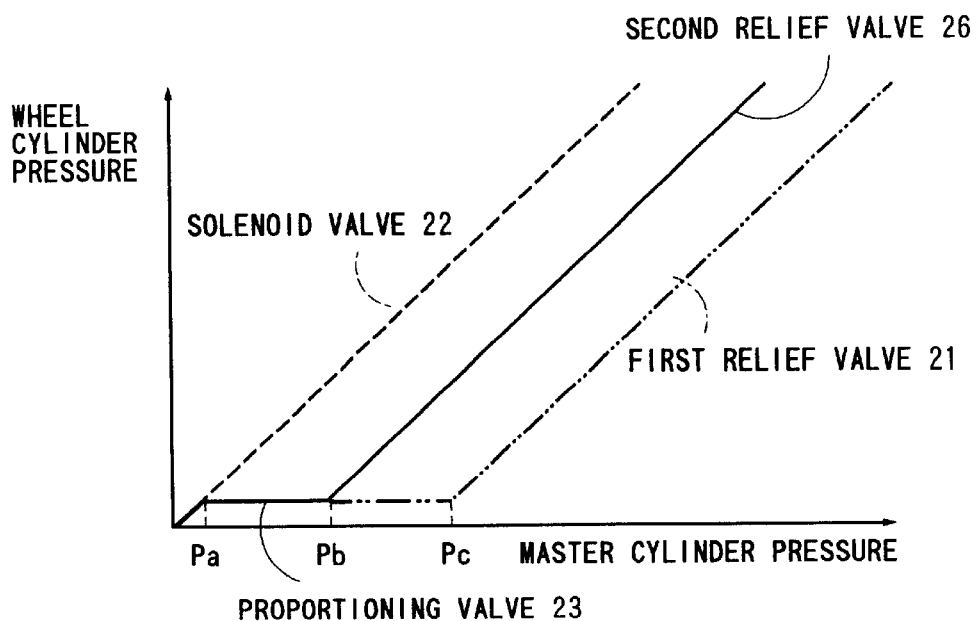
FIG. 6 is a diagram showing a relationship between a master cylinder pressure and a wheel cylinder pressure with respect to first and second relief valves, proportioning valve and solenoid valve according to the above embodiment of the present invention.

The first relief valve 21, solenoid valve 22 and proportioning valve 23 in the pressure limit changeover device 20 have such characteristics as shown in FIG. 6. The proportioning valve 23 has such a characteristic that the master cylinder pressure is increased in response to depression of the brake pedal 5 when the braking operation started, so that the hydraulic pressure in the wheel cylinder, i.e., wheel cylinder pressure, is increased in proportion to the increase of the master cylinder pressure. When the wheel cylinder pressure reaches a predetermined pressure (Pa), the wheel cylinder pressure is held to be substantially constant, and thereafter it will be increased by a small amount in response to the increase of the stroke of the brake pedal 5. The predetermined pressure (Pa) is set as low as a value which enables the brake fluid to be fulfilled in the wheel brake cylinders so as to cause a brake pad (not shown) to abut on a rotor (not shown). Thus, the proportioning valve 23 has various functions such as a function for fulfilling the brake fluid in the brake system at the start of the braking operation, a function for blocking the pressure until the relief valve 21 operates, and a function for returning the brake fluid from the wheel brake cylinders 51 and etc. to the master cylinder 2.

The first relief valve 21 operates in such a manner that it is closed until the master cylinder pressure reaches a predetermined pressure (Pc), as shown by a two-dot chain line in FIG. 6 and opened when the master cylinder pressure exceeds the predetermined pressure (Pc), and thereafter the wheel cylinder pressure is increased in proportion to the increase of the master cylinder pressure. The second relief valve 26 operates in such a manner that it is closed until the master cylinder pressure reaches a predetermined pressure (Pb), which is lower than the predetermined pressure (Pc), as shown by a solid line in FIG. 6 and opened when the master cylinder pressure exceeds the predetermined pressure (Pb), and thereafter the wheel cylinder pressure is increased in proportion to the increase of the master cylinder pressure. The solenoid valve 27 is provided for controlling the operation of the second relief valve 26, while the solenoid valve 22 has such a characteristic that the wheel cylinder pressure corresponds to the master cylinder pressure when the solenoid valve 22 is placed in its open position, as indicated by a broken line in FIG. 6. In other words, a zone in FIG.6 surrounded by the broken line indicating the characteristic of the solenoid valve 22, and solid lines indicating the characteristics of the first relief valve 21 or the second relief valve 26, and the proportioning valve 23, is a pressure decreasing zone, where the regenerative braking operation is to be performed in lieu of the hydraulic braking operation.

As shown in FIG. 1, the brake pedal 5 is provided with a brake switch 6 which is turned on when the brake pedal 5 is depressed, and which is connected to the electronic control unit 10, to which the pressure sensors 24, 25 are connected as well. A shift position of the transmission 12 is detected to feed its output signal into the electronic control unit 10. Furthermore, wheel speed sensors 91–94 are provided for the wheels (FR), (FL), (RR), (RL), respectively, and connected to the electronic control unit 10 for feeding thereinto pulse signals proportional to the rotational speeds of the wheels, or the wheel speeds, respectively.

Furthermore, a sub-cylinder 70 is disposed in the main passage 8 between the pressure limit changeover device 20 and the front wheel brake cylinders 51, 52, and connected to an auxiliary passage 9a which is separated from the main passage 9. The sub-cylinder 70 includes a cylindrical housing 71 with an inner bore defined therein, and a piston 72 which is slidably received in the inner bore of the housing 71 to define therein a first pressure chamber 74 and a second pressure chamber 75 on the opposite sides of the piston 72. A spring 73 is disposed in the second pressure chamber 75 to urge the piston 72 to the left in FIG. 1 so as to expand the volume of the second pressure chamber 75 to its maximum volume, so that the volume of the first pressure chamber 74 is minimum. The solenoid valve 61 is disposed on the auxiliary passage 9a which is connected to the first pressure chamber 74. In parallel with the solenoid valve 61, a check valve 62 is disposed. The solenoid valve 61 is of a normally closed two-port two-position electromagnetic valve, which is closed when it is in its inoperative condition, and opened to communicate the first pressure chamber 74 with the regulator 3 through the auxiliary passage 9a when it is in its operative condition. The check valve 62 is provided for allowing the brake fluid to flow from the sub-cylinder 70 to the regulator 3 and blocking the reverse flow.

According to the sub-cylinder 70, therefore, when the solenoid valve 61 is opened, the regulated pressure which is substantially equal to the master cylinder pressure is supplied to the first pressure chamber 74, and the wheel cylinder pressure is supplied to the second pressure chamber 75, so that the regulated pressure output from the regulator 3 and the wheel cylinder pressure in the wheel brake cylinder are fluidly separated. When the regulated pressure and the wheel cylinder pressure are not supplied to the first and second pressure chambers 74, 75, respectively, the piston 72 is placed at a position where the volume of the first pressure chamber 74 is minimum as shown in FIG. 1. When the regulated pressure is supplied from the regulator 3 to the first pressure chamber 74 through the solenoid valve 61 in its open position, the piston 72 is pushed in such a direction as to compress the second pressure chamber 75 against the biasing force of the spring 73, so that the pressurized brake fluid is discharged from the second pressure chamber 75 through the main passage 8 into the wheel brake cylinders 51, 52 to increase the pressure therein. In this case, the brake fluid will not be excessively supplied into the wheel brake cylinders 51, 52, because the amount of the brake fluid supplied into the wheel brake cylinders 51, 52 is limited to the maximum volume of the second pressure chamber 75. In the present invention, however, the regulated pressure may be supplied directly into the wheel brake cylinders 51, 52 when the solenoid valve 61 is opened, so that the sub-cylinder 70 may be omitted.

As shown by one-dot chain line in FIG. 1, a modulator (MD) having a plurality of solenoid valves (not shown) is disposed between the sub-cylinder 70 and the wheel brake cylinders 51, 52, and between the pressure limit changeover device 30 and the wheel brake cylinders 53, 54. Each solenoid valve is electrically connected to the electronic control unit 10, to be controlled thereby. According to the modulator (MD), not only an anti-skid control but also a traction control, front-rear braking force distribution control, steering control by braking and the like can be performed.

Figure 5:
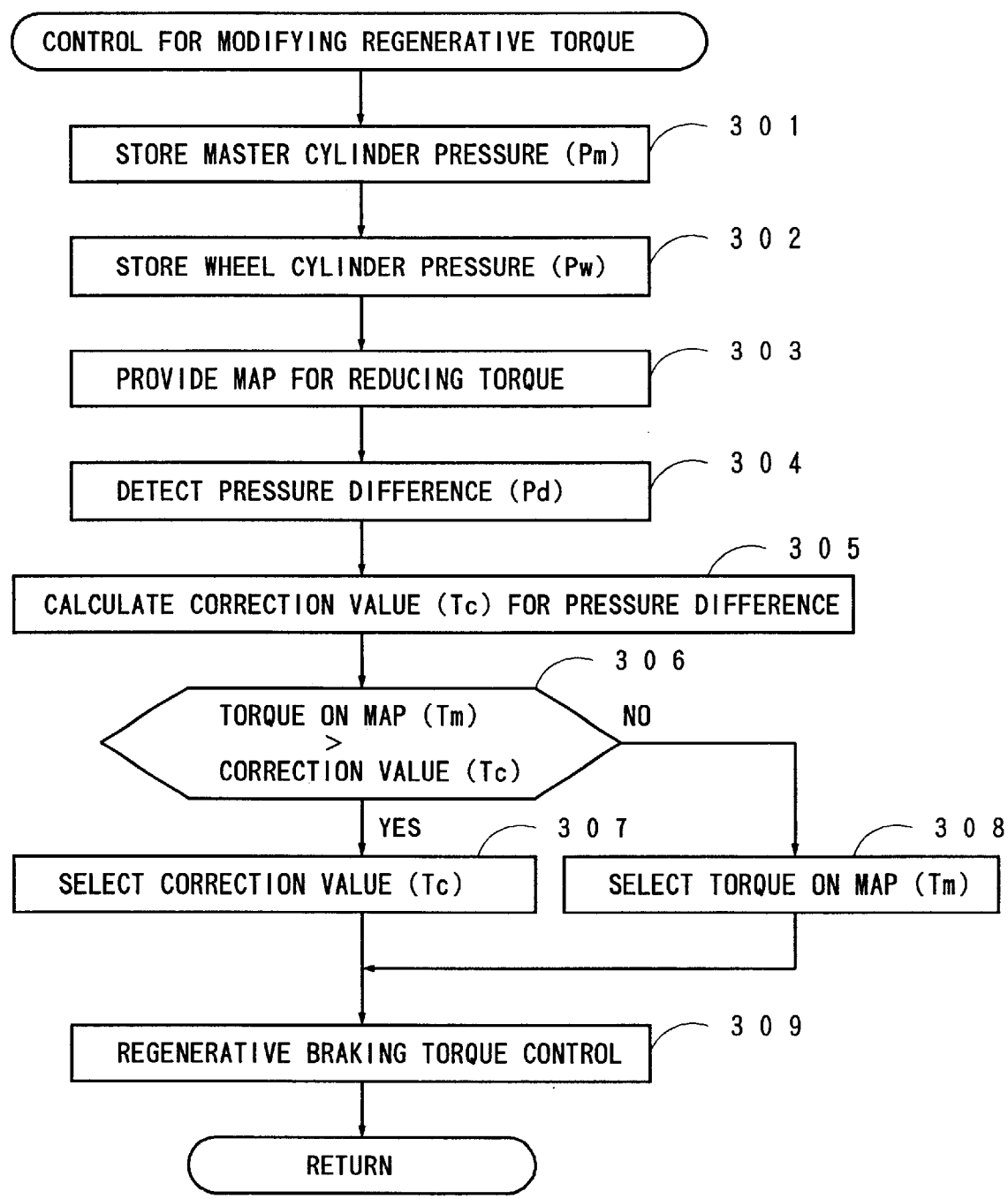
FIG. 5 is a flowchart showing a control for modifying the regenerative braking torque according to the above embodiment of the present invention.

According to the brake control system as structured in FIG. 1, the hydraulic pump 41 is driven by the electric motor 42 to accumulate the power pressure in the accumulator 44 as described before. In the case where the solenoid valves are placed in the positions as shown in FIG. 1, when the brake pedal 5 is depressed, the master cylinder pressure is output from the master cylinder 2, and the regulated pressure is output from the regulator 3. Then, the brake control operation is initiated by the electronic control unit 10, so that the program corresponding to flowcharts as shown in FIGS. 2, 3 and 5 is executed while the vehicle is moving.

Figure 2:
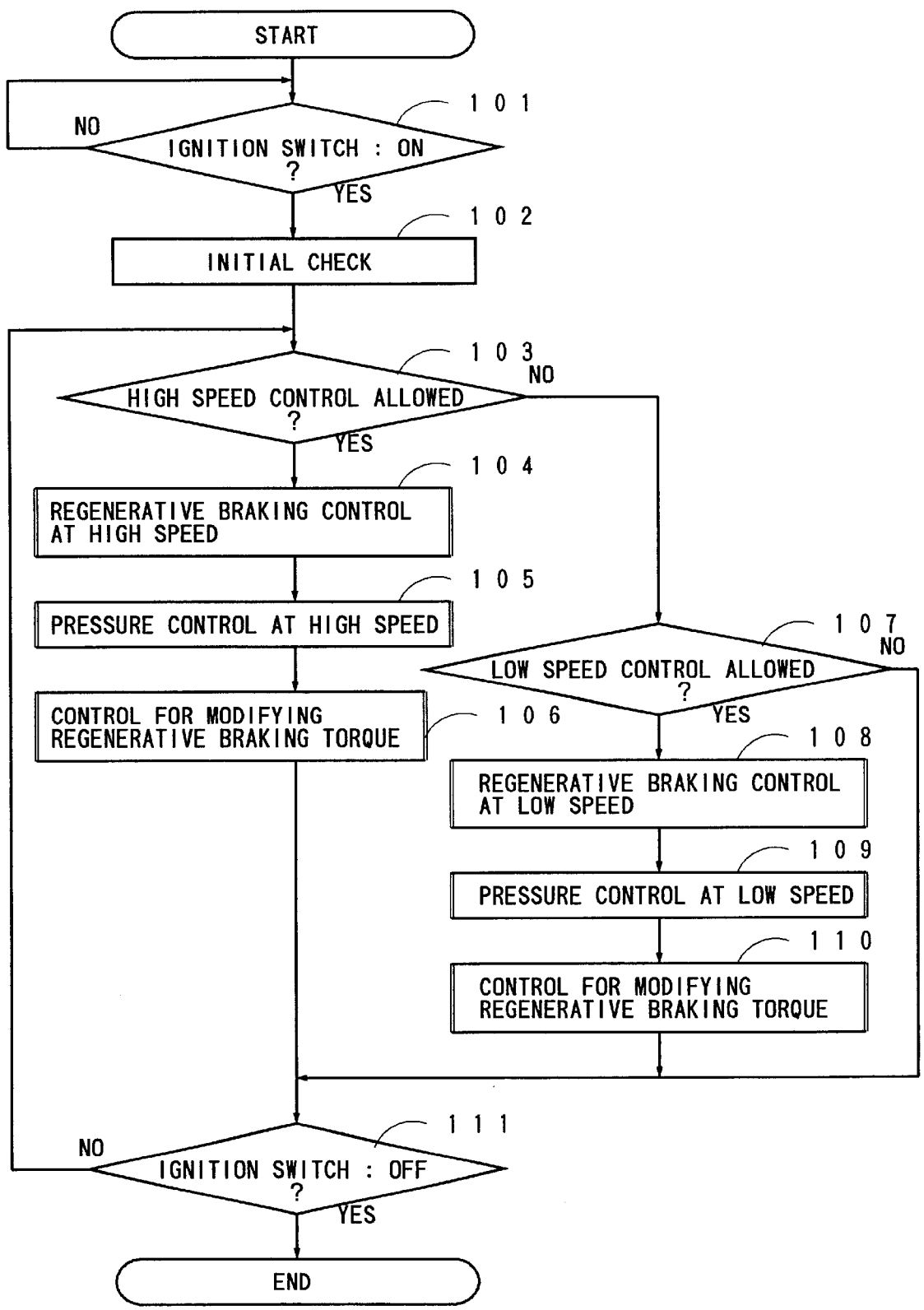
FIG. 2 is a flowchart showing a brake control operation according to the above embodiment of the present invention.
Figure 3:
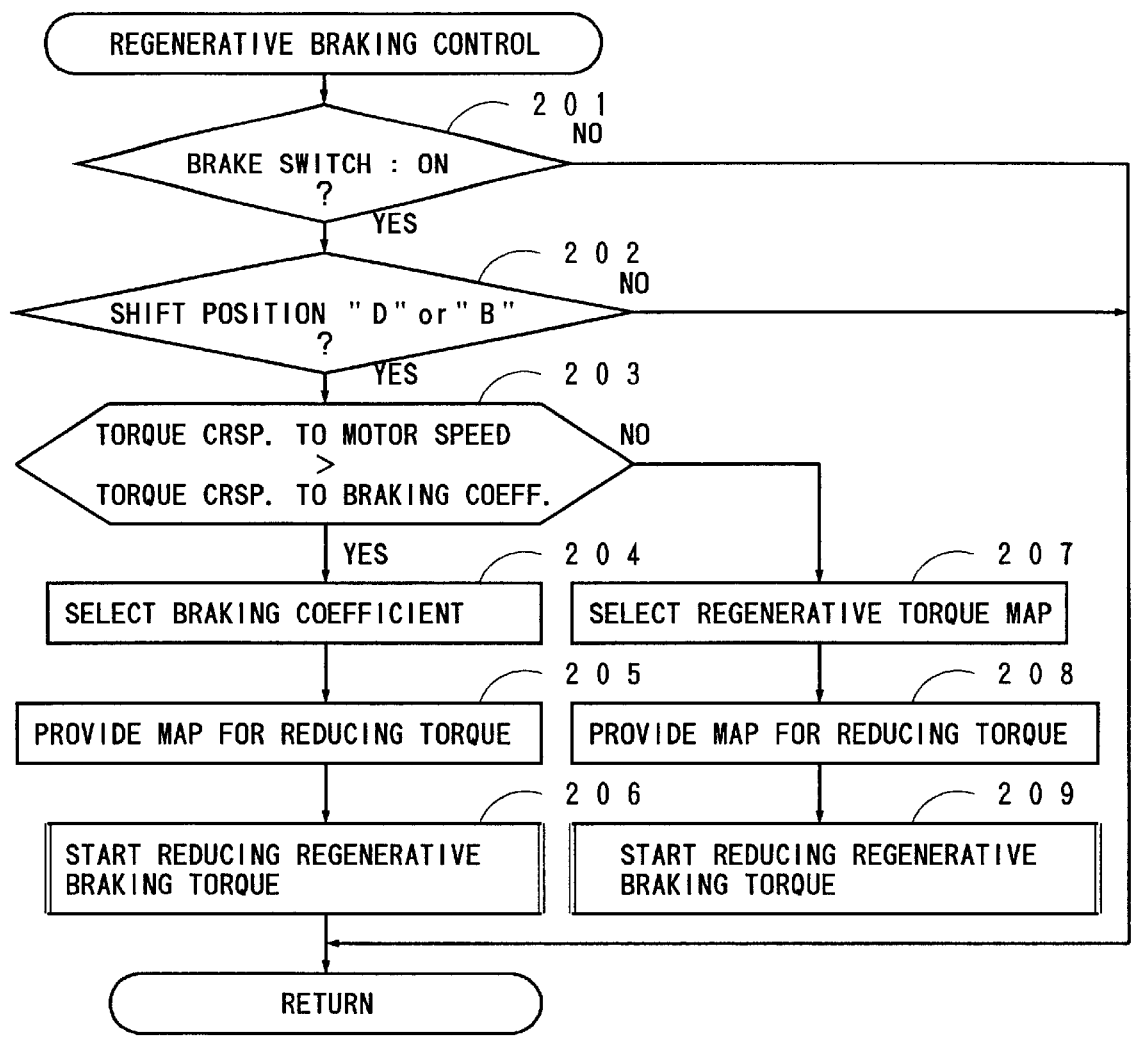
FIG. 3 is a flowchart showing a regenerative braking control operation according to the above embodiment of the sent invention.

Referring to FIG. 2, when an ignition switch (not shown) is turned on at Step 101, the program proceeds to Step 102 where an initial check is executed. That is, on the basis of the detected conditions of the electric motor 11, transmission 12 and battery 13, it is determined whether the condition for starting the regenerative braking operation has been fulfilled or not. For example, when the vehicle travels at a very low speed, or when the battery 13 has been fully charged, or when a malfunction occurs, or when the transmission 12 is shifted in its neutral position, it is determined that the condition for starting the regenerative braking operation has not been fulfilled, so that a certain warning will be made.

If the starting condition of the regenerative braking operation has been fulfilled, the program proceeds to Step 103 where a condition for performing a hydraulic pressure control to be made when the vehicle travels at a relatively high speed has been fulfilled, or not. If this condition has been fulfilled, the program proceeds to Steps 104–106, where the regenerative braking control and hydraulic pressure control to be made when the vehicle travels at high speed will be executed according to sub-routines (not shown), respectively and a control for modifying the regenerative braking torque will be executed as described later. Otherwise, the program proceeds to Step 107, where a condition for performing a hydraulic pressure control to be made when the vehicle travels at a relatively low speed has been fulfilled, or not. If this condition has been fulfilled, the program proceeds to Steps 108–110, where the regenerative braking control and hydraulic pressure control to be made when the vehicle travels at low speed will be executed according to sub-routines (not shown), respectively, and the control for modifying the regenerative braking torque will be executed. If the condition has not been fulfilled, the program proceeds to Step 111, where it is determined whether the ignition switch (not shown) has been turned on or off. Accordingly, Steps 103–110 are repeatedly executed, until it is determined at Step 111 that the ignition switch has been turned off.

The regenerative braking control to be made at Steps 104, 108 will be explained hereinafter, with reference to FIG. 3. At the outset, it is determined at Step 201 whether the brake switch 6 has been turned on or off. If the brake switch 6 has been turned on, the program proceeds to Step 202 where a shift position of the transmission 12 is determined. If the shift position is placed in a driving range (D) or a motor braking range (B), the program proceeds to Step 203. If the result determined at Steps 201, 202 is negative, the program returns to the main routine. The motor braking range (B) is a range specifically provided for the electrically operated vehicle, wherein a braking condition similar to a so-called engine brake is obtained without maneuvering the brake pedal 5.

Figure 4:
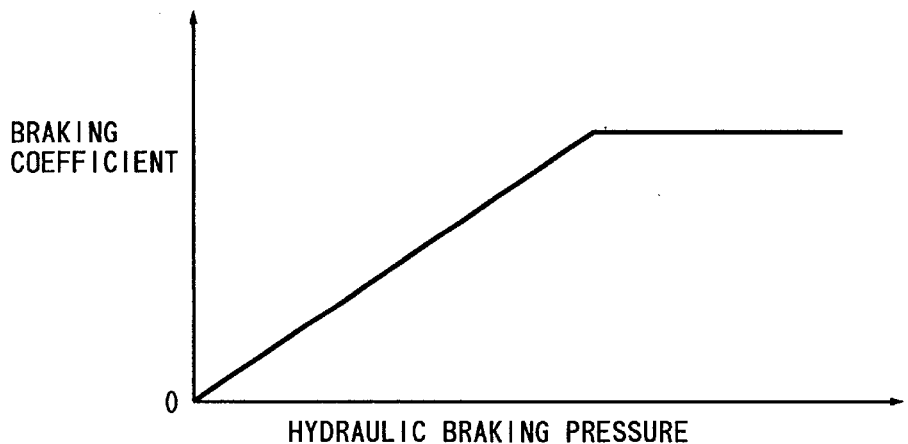
FIG. 4 is a diagram showing a relationship between a braking coefficient and a hydraulic braking pressure according to the above embodiment of the present invention.

According to the present embodiment, a regenerative braking torque map (not shown), which provides a relationship between a rotational speed of the motor and a master cylinder pressure, is stored in the memory, so as to produce a regenerative braking torque in response to a rotational speed of the motor 11 which corresponds to a vehicle speed. Also stored in the memory is a braking coefficient which represents a regenerative braking torque corresponding to a hydraulic braking pressure, as shown in FIG. 4. For example, the braking coefficient is set to be "1.0" for "120 N·m" of the regenerative braking torque, where "N·m" indicates "Newton·meter".

Then, at Step 203, the torque corresponding to the rotational speed of the motor provided in response to the master cylinder pressure is compared with the torque corresponding to the braking coefficient provided in response to the master cylinder pressure. If the former torque is greater than the latter torque, the program proceeds to Step 204, where the braking coefficient is selected, and a map for reducing the regenerative braking torque is provided at Step 205. The map for reducing the regenerative braking torque is provided for forcibly reducing the regenerative braking torque at a relatively low speed, so that the rotational speed of the motor for starting to reduce the regenerative braking torque is set in response to the master cylinder pressure. Accordingly, the operation for reducing the regenerative braking torque starts at Step 206, when the motor speed comes to be the one set in accordance with the map for reducing the regenerative braking torque. On the contrary, if the torque corresponding to the braking coefficient provided in response to the master cylinder pressure is greater than the torque corresponding to the motor speed provided in response to the master cylinder pressure, the program proceeds to Step 207, where the regenerative braking torque map is selected, and further proceeds to Step 208, where the map for reducing the regenerative braking torque is provided. Then, the program proceeds to Step 209, where the operation for reducing the regenerative braking torque starts, at the rotational speed of the motor, i.e., the vehicle speed provided in response to the master cylinder pressure, in accordance with the map for reducing the regenerative braking torque. Thus, when the master cylinder pressure is relatively high in pressure, the operation for reducing the regenerative braking torque starts from a relatively high speed range of the motor speed (high vehicle speed), whereas, when the master cylinder pressure is relatively low in pressure, the operation for reducing the regenerative braking torque starts from a relatively low speed range of the motor speed (low vehicle speed).

Next, the control for modifying the regenerative braking torque executed at Steps 106, 110, will be explained with reference to FIG. 5. At Step 301, the master cylinder pressure (Pm) detected by the pressure sensor 24 is stored in the memory of the electronic control unit 10. Likewise, at Step 302, the wheel cylinder pressure (Pw) detected by the pressure sensor 25 is stored in the memory of the electronic control unit 10. Then, provided at Step 303 is the map for reducing the regenerative braking torque, which is provided for forcibly reducing the regenerative braking torque at a relatively low speed, as described before. According to this map, the rotational speed of the motor, i.e., the vehicle speed for starting the control for reducing the regenerative braking torque is set in response to the master cylinder pressure (Pm) for example, and a desired value of the regenerative braking torque to be reduced is set as a torque on map (Tm).

Then, the program proceeds to Step 304, where a pressure difference (Pd) between the master cylinder pressure (Pm) and the wheel cylinder pressure (Pw) is calculated (Pd=Pm−Pw), after the control for reducing the regenerative braking torque started, at the latest. On the basis of this pressure difference (Pd), a correction value (Tc) for the pressure difference is calculated at Step 305, as follows;

$$Tc(N·m)=Pd(Mpa)·120(N·m)/2(Mpa)$$

where (N·m) indicates a unit of "Newton·meter", and (Mpa) indicates a unit of "mega pascal". If the pressure difference (Pd) is equal to or greater than 2(Mpa), the pressure difference (Pd) is set to be 2(Mpa). That is, the upper limit of the pressure difference (Pd) is 2(Mpa).

The torque on map (Tm) is compared with the correction value (Tc) at Step 306. If the torque on map (Tm) is greater than the correction value (Tc), the program proceeds to Step 307, where the smaller one, i.e., the correction value (Tc) is selected. If the correction value (Tc) is greater than the torque on map (Tm), the program proceeds to Step 308, where the smaller one, i.e., the torque on map (Tm) is selected. Then, the program proceeds to Step 309, where the regenerative braking torque control including the control for reducing the regenerative braking torque will be performed, in accordance with a sub-routine therefor (not shown).

Figure 7:
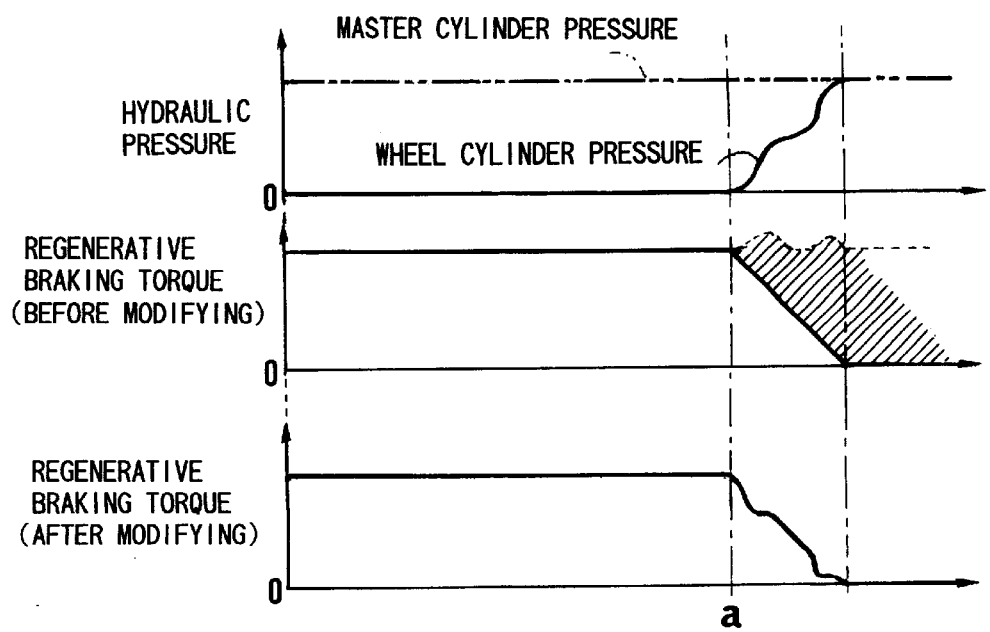
FIG. 7 is a diagram showing variations of the master cylinder pressure, wheel cylinder pressure and regenerative braking torque according to the above embodiment of the present invention.

FIG. 7 shows variations of the master cylinder pressure, wheel cylinder pressure and regenerative braking torque according to the present embodiment. For example, the rotational speed of the motor is selected in response to the master cylinder pressure, with reference to the map for reducing the regenerative braking torque (not shown). When the rotational speed of the motor has increased to reach the selected speed at a point "a" in FIG. 7, for example, the control for reducing the regenerative braking torque starts. In FIG. 7, an area having inclined lines indicates a total braking torque combining the braking torque obtained through the hydraulic braking operation and the braking torque obtained through the regenerative braking operation performed during the control for reducing the regenerative braking torque. In this case, an excessive braking torque is produced, as indicated by extending portions of the area having the inclined lines in FIG. 7, thereby to deteriorate the brake feeling. According to the present embodiment, therefore, the correction value (Tc) for the pressure difference is calculated on the basis of the pressure difference (Pd) between the master cylinder pressure (Pm) and the wheel cylinder pressure (Pw). In response to the correction value (Tc) for the pressure difference, the regenerative braking torque is controlled, as shown in the bottom section in FIG. 7, to modify the characteristic of the control for reducing the regenerative braking torque. As a result, variation of the total braking torque obtained through the hydraulic braking operation and the regenerative braking operation will be minimized, so that a stable braking force can be applied to the wheel until the vehicle stops. That is, irrespective of the variation of the hydraulic braking operation for compensating for a lack of regenerative braking torque, the braking force can be controlled smoothly to provide a proper brake feeling.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A brake control system for controlling a braking force applied to a wheel of an electrically operated vehicle, comprising:

an electric motor operatively connected to said wheel for rotating said wheel;

a battery mounted on said vehicle and electrically connected to said electric motor for driving said electric motor;

motor control means for controlling said electric motor to apply a rotating torque to said wheel and apply a regenerative braking torque to said wheel;

a wheel brake cylinder operatively mounted on said wheel for applying a hydraulic braking torque to said wheel;

pressure generating means for pressurizing brake fluid to generate a hydraulic braking pressure in response to operation of a manually operated braking member;

pressure control means for controlling the hydraulic braking pressure generated by said pressure generating means and supplied to said wheel brake cylinder to apply the hydraulic braking torque to said wheel;

monitor means for monitoring a rotational speed of said electric motor;

regenerative braking torque reducing means for reducing the regenerative braking torque in response to the rotational speed of the electric motor monitored by said monitor means, said pressure control means applying the hydraulic braking torque to said wheel when said regenerative braking torque reducing means starts reducing the regenerative braking torque;

pressure difference detection means for detecting a pressure difference between the hydraulic braking pressure of the brake fluid discharged from said pressure generating means and the hydraulic braking pressure in said wheel brake cylinder; and modifying means for modifying a characteristic of the regenerative braking torque reduced by said regenerative braking torque reducing means, in response to the pressure difference detected by said pressure difference detection means.

2. The brake control system as set forth in claim 1, wherein said pressure generating means includes a master cylinder for pressurizing the brake fluid stored in a reservoir in response to operation of said manually operated braking member to generate a static hydraulic braking pressure, and wherein said pressure difference detection means is adapted to detect the pressure difference between the hydraulic braking pressure of the brake fluid discharged from said master cylinder and the hydraulic braking pressure in said wheel brake cylinder.

3. The brake control system as set forth in claim 2, wherein said modifying means includes:

means for setting a desired value of the regenerative braking torque to be reduced when said regenerative braking torque reducing means starts reducing the regenerative braking torque;

means for providing a correction value of the regenerative braking torque to be reduced, in response to the pressure differences detected by said pressure difference detection means;

means for comparing the desired value with the correction value; and means for selecting the lower value between the desired value and the correction value to reduce the regenerative braking torque by said regenerative braking torque reducing means.

4. The brake control system as set forth in claim 3, wherein said means for setting the desired value is adapted to set the desired value in response to the hydraulic braking pressure of the brake fluid generated from said master cylinder.

5. The brake control system as set forth in claim 1, wherein said pressure generating means includes a master cylinder for pressurizing the brake fluid stored in a reservoir in response to operation of said manually operated braking member to generate a static hydraulic braking pressure, and an auxiliary power source for pressurizing the brake fluid stored in said reservoir irrespective of operation of said manually operated braking member to generate a power hydraulic pressure, and wherein said pressure control means is adapted to supply the power hydraulic pressure to said wheel brake cylinder to apply the hydraulic braking torque to said wheel, and wherein said pressure difference detection means is adapted to detect the pressure difference between the hydraulic braking pressure of the brake fluid discharged from said master cylinder and the hydraulic braking pressure in said wheel brake cylinder.

* * * * *